Figure 7:
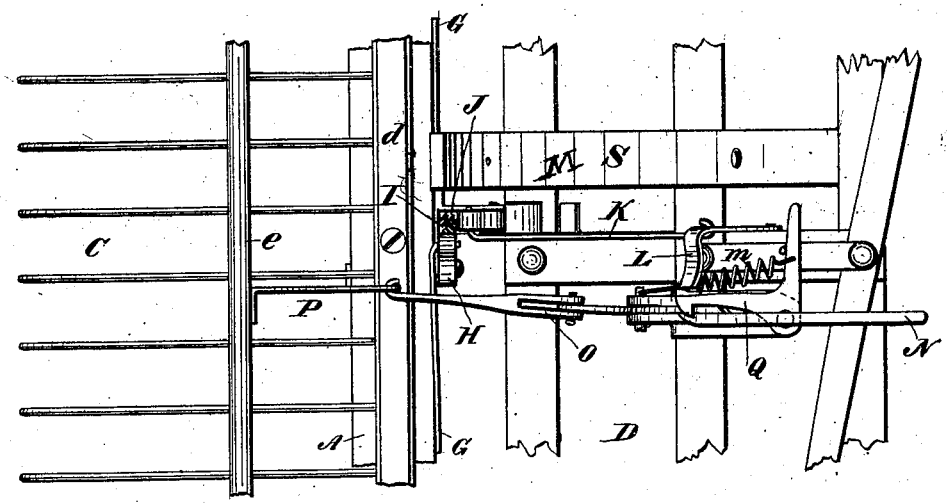

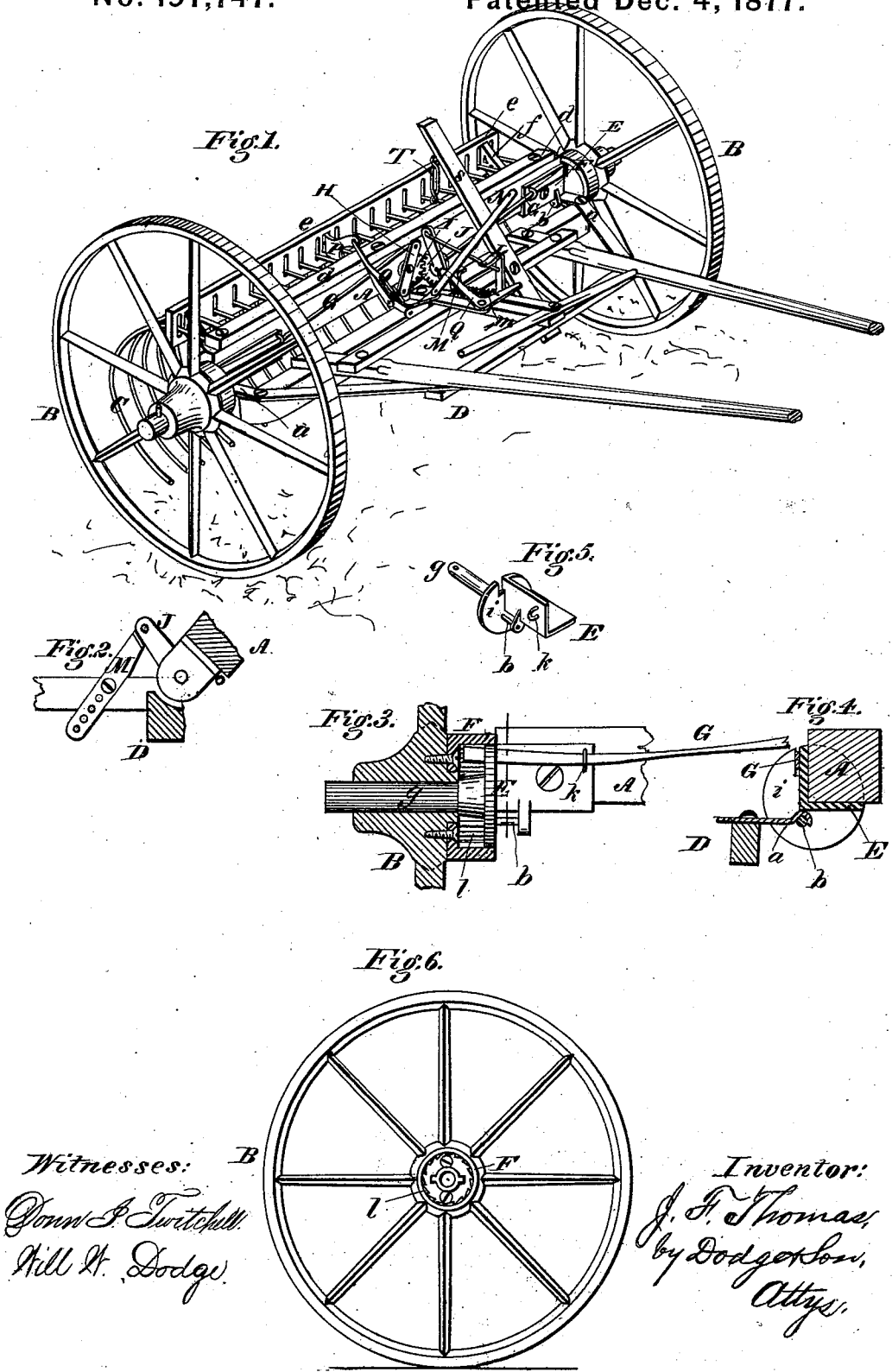

2 Sheets—Sheet 2.

J. F. THOMAS.
Horse Hay-Rakes.

No. 197,747. Patented Dec. 4, 1877.

Witnesses:
Donn J. Twitchell
Will H. Dodge

Inventor:
J. F. Thomas.
by Dodge & Son,
Attys.

UNITED STATES PATENT OFFICE.

JOHN F. THOMAS, OF ILION, NEW YORK.

IMPROVEMENT IN HORSE HAY-RAKES.

Specification forming part of Letters Patent No. 197,747, dated December 4, 1877; application filed February 10, 1877.

*To all whom it may concern:*

Be it known that I, JOHN F. THOMAS, of Ilion, in the county of Herkimer and State of New York, have invented certain Improvements in Horse Hay-Rakes, of which the following is a specification:

My invention relates to that class of wheeled rakes in which the teeth are raised by the wheels to discharge the hay; and the invention consists in various improvements in the details, as hereinafter described.

Figure 1 is a perspective view of a rake having my improvements embodied therein; Fig. 2, a view showing the adjustable arm by which the rise of the rake-teeth is limited; Fig. 3, a sectional view through one of the main wheels, with the adjacent parts exposed to view; Fig. 4, a cross-section of the axle near one of the wheels, showing the manner in which the draft-frame is connected thereto; Fig. 5, a perspective view of one of the axle-caps or journal-blocks; Fig. 6, an inside face view of one of the main wheels; Fig. 7, a plan view of the central portion of the rake, showing the devices by which the rise and fall of the teeth are controlled.

A represents a square wooden axle, sustained at its ends by two loose wheels, B, and provided, as usual, with a series of wire rake-teeth, C. D represents a front or draft frame, connected to the lower front corner of the axle, and serving as a means of drawing the machine and carrying the operator.

As shown in the drawing, the front or draft frame, which consists simply of the thills or shafts united by cross-bars, is provided with metal arms a, which have their rear ends made of a hooked form, and engaged with corresponding eyes or stirrups b on the axle, as in Figs. 1 and 4, the arrangement of parts being such that the hooks may be readily engaged and disengaged when the axle is turned backward beyond its working position, but at no other time.

This method of connecting the draft-frame and axle is exceedingly cheap and secure, and admits of their being readily connected and disconnected without the employment of tools or appliances of any kind for the purpose—a great convenience when the rake is being shipped or stowed away.

The eyes or stirrups b, into which the hooks of the draft-frame engage, may be formed and secured to the axle in any suitable manner; but it is preferred to form them on the metal heads or journal-plates E, which are used on the ends of the axle, and which will be hereinafter more fully described.

The rake-teeth C have their forward ends bent at right angles, and secured upon the axle by means of a recessed bar, d, fastened down upon them by screws passing into the axle, and in rear of the axle they pass through vertical slots in a longitudinal bar, e, which is attached rigidly to the axle by means of arms f, as shown, so that when the forward rotation of the axle occurs it raises the bar e, and causes the same to lift all the teeth from the ground.

The wheels B are not mounted directly on the ends of the axle, but upon metal journals g, which are formed on metal journal-plates or heads E, secured on the ends of the axle.

As shown in Fig. 5, each head E is provided with flanges, to bear against the front and under sides of the axle, with the before-mentioned eye b, to receive the hook of the draft-frame, and also with a circular plate, i, to cover the end of the wheel-hub, and an eye, k, to support and guide a ratchet-rod, hereinafter described.

In order to effect the raising of the rake-teeth to discharge the gathered hay, the main wheels are provided, on the inner ends of their hubs, with peripheral flanges or rims F, having inside ratchet-teeth l, and the axle provided, on its front side, with rods G, arranged to engage at their outer ends with the ratchet-teeth, as shown. The outer ends of the rods are passed through the eyes k on the axle-caps, and through slots in the plates i into the flanged ends of the hubs, and are made elastic, so that when the wheels are turned backward the rods will spring laterally, and permit the ratchet-teeth to pass them without taking hold. The inner ends of the two rods are pivoted to opposite ends of a lever, H, which is pivoted at its middle to the front side of the axle, as shown in Figs. 1 and 7.

The lever H is provided with a segmental bevel-pinion, I, gearing into a corresponding pinion, J, which latter is mounted in a support of the front of the axle, and provided with an arm, connected by a rod, K, with a foot-lever, L, mounted on the front frame, as shown. By moving the foot-lever forward the rods G are thrust outward and their ends caused to engage with the ratchet-teeth, so that as the rake advances the wheels will, by means of the rods, turn the axle and elevate the teeth. By moving the foot-lever backward the rods are drawn inward clear of the ratchet-teeth, and the wheels permitted to revolve independently of the axle. This backward movement of the rods G, in order to release the teeth and permit them to fall after they have been raised to the proper elevation to discharge the hay, is effected automatically by means of an adjustable arm, M, secured upon the front frame, as shown in Figs. 1, 2, and 7. As the axle turns forward the arm of the pinion J comes in contact with and is stopped by the arm M, thereby holding the pinion J still while the pinion I is carried around it by the rotation of the axle, whereby the pinion I is caused to turn and operate the lever H, so as to draw the ratchet-rods inward. By changing the height of the arm M it may be caused to stop the arm of the pinion sooner or later, and thus the height to which the rake-teeth are raised be varied, as circumstances may require.

In order to hold the rake-teeth down to their work, and to admit of their being raised by hand when desired, a hand-lever, N, is mounted on the draft-frame, and connected by a link or rod, O, with an arm, P, rigidly secured to the axle, as shown in Figs. 1 and 7, and an elbow-catch, Q, mounted on the front frame, and connected with a spring, m, by which it is caused to engage with the lever N and hold the same forward. When the teeth are to be raised by hand the catch Q is disengaged from the lever by the foot of the operator and the lever drawn backward. The catch is located in such position that it will be released by the foot-lever L, when the latter is thrown forward to cause the raising of the rake-teeth from the ground by the wheels.

In order to sustain the teeth in an elevated position when the rake is being moved to and from the field, I provide the standard S, which is mounted rigidly on the front frame, as usual, to sustain the operator's seat, with a pendent spring hook or catch, T, which may be clasped around one of the elevated teeth, so as to hold the same, and thereby the rest of the series also, from descending.

The catch T consists merely of a single piece of spring-wire doubled at its middle, and having its ends crossed and then bent inward toward each other, as shown, thus forming a spring-clasp, the jaws of which may be opened by grasping it tightly about the middle.

In the drawings I have represented the toothed flanges of the wheel-hubs as separate and detachable from the hubs. As such construction forms the subject-matter of an application hitherto filed by me, I make no claim thereto in this patent.

Having described my invention, what I do claim is—

1. In a hay-rake, the combination of the axle A, the wheels B, having the internally-toothed flanges F and the spring-rods G, mounted on the axle and engaging within the flanges, as shown.

2. In a hay-rake, the combination of the axle A, the internally-toothed flanges F on the wheel-hubs, and the spring-rods G, mounted on the axle and arranged to move endwise, as shown and described.

3. In combination with the rods G, arranged to operate as shown and described, the lever H, pinions I J, rod K, and foot-lever L, as shown.

4. In combination with the pinion J, arranged as and for the purpose described, the adjustable stop-arm M, mounted on the front frame.

5. The combination, in a hay-rake, of the axle A and the front or draft frame D, united by hooks a, constructed and arranged to operate as set forth.

6. In combination with the catch Q, arranged as shown, for the purpose of locking the rake-teeth down, the lever L, for throwing the dumping devices into action, arranged to strike and release the catch, as and for the purpose described.

JOHN F. THOMAS.

Witnesses:
A. M. ROSS,
WM. H. CURRY.